(12) United States Patent  
Kanje-Nordberg et al.

(10) Patent No.: US 12,374,473 B2  
(45) Date of Patent: Jul. 29, 2025

(54) CONDENSER CORE WITH GROUNDED CONDUCTIVE FOILS IN A CAPACITIVE LAYER

(71) Applicant: Hitachi Energy Ltd, Zürich (CH)

(72) Inventors: Jens Kanje-Nordberg, Ludvika (SE); Peter Sjöberg, Ludvika (SE); Kenneth Johansson, Täby (SE)

(73) Assignee: Hitachi Energy Ltd, Zürich (CH)

( * ) Notice: Subject to any disclaimer, the term of this patent is extended or adjusted under 35 U.S.C. 154(b) by 381 days.

(21) Appl. No.: 17/778,467

(22) PCT Filed: Oct. 27, 2020

(86) PCT No.: PCT/EP2020/080171  
§ 371 (c)(1),  
(2) Date: May 20, 2022

(87) PCT Pub. No.: WO2021/099075  
PCT Pub. Date: May 27, 2021

(65) Prior Publication Data  
US 2022/0415544 A1    Dec. 29, 2022

(30) Foreign Application Priority Data  
Nov. 20, 2019 (EP) .................... 19210238

(51) Int. Cl.  
*H01B 17/28* (2006.01)  
*H01G 4/242* (2006.01)  
*H01G 4/16* (2006.01)

(52) U.S. Cl.  
CPC ............ *H01B 17/28* (2013.01); *H01G 4/242* (2013.01); *H01G 4/16* (2013.01)

(58) Field of Classification Search  
CPC ...................................................... H01B 17/28  
(Continued)

(56) References Cited

U.S. PATENT DOCUMENTS 3,484,679 A    12/1969    Hodgson et al.  
3,600,502 A    8/1971    Wagenaar et al.  
(Continued)

FOREIGN PATENT DOCUMENTS

CN    200968968 Y    10/2007  
CN    104089569    * 7/2014  
(Continued)

OTHER PUBLICATIONS

International Search Report and Written Opinion of the International Searching Authority, PCT/EP2020/080171, mailed Feb. 5, 2021, 14 pages.  
(Continued)

*Primary Examiner* — Stanley Tso  
(74) *Attorney, Agent, or Firm* — Sage Patent Group

(57) ABSTRACT

The present disclosure relates to a condenser core configured for surrounding an electrical conductor. The condenser core includes an insulation material and a plurality of electrically conducting capacitive layers for modifying electrical fields formed by a current flowing in the electrical conductor. At least one of the electrically conducting capacitive layers includes a first foil and a second foil. Each of the first and second foils of an outermost capacitive layer is connected with a grounding arrangement for grounding the foils.

15 Claims, 1 Drawing Sheet

(58) Field of Classification Search
USPC .......................................................... 174/143
See application file for complete search history.

(56) References Cited

U.S. PATENT DOCUMENTS

| | | | |
|---|---|---|---|
| 3,793,475 A | 2/1974 | Yonkers | |
| 3,875,327 A | 4/1975 | Hildenbrand | |
| 2013/0112473 A1* | 5/2013 | Toyama | B60R 16/0215 174/70 R |
| 2022/0037062 A1* | 2/2022 | Pancheshnyi | H01B 7/28 |

FOREIGN PATENT DOCUMENTS

| | | |
|---|---|---|
| CN | 104089569 B | 5/2017 |
| WO | WO 80/00762 | 4/1980 |

OTHER PUBLICATIONS

Extended European Search Report, European Patent Application No. 19210238.2, mailed May 25, 2020, 8 pages.

Ding, H., et al., "Ageing Mechanisms and Diagnostics for High Voltage Bushings—An Overview," UNSUCON2017—13$^{th}$ International Electrical Insulation Conference, Birmingham, UK, May 16, 2017 (XP033248441) 6 pages.

Office Action, European Patent Application No. 20793415.9, mailed Feb. 13, 2025, 8 pages.

\* cited by examiner

CONDENSER CORE WITH GROUNDED CONDUCTIVE FOILS IN A CAPACITIVE LAYER

CROSS REFERENCE TO RELATED APPLICATIONS

This application is a 35 U.S.C. § 371 national stage application of PCT International Application No. PCT/EP2020/080171 filed on Oct. 27, 2020, which in turn claims foreign priority to European Patent Application No. 19210238.2 filed on Nov. 20, 2019, the disclosures and content of which are incorporated by reference herein in their entirety.

TECHNICAL FIELD

The present disclosure relates to a condenser core, e.g., of a bushing or cable termination, having electrically conductive foils for modifying electrical fields formed by a current flowing in an electrical conductor passing through the condenser core.

BACKGROUND

A condenser core is used for insulating an electrical conductor and modifying the electrical field formed around the electrical conductor when an electrical current is flowing there through. The condenser core is made up of an electrically insulating material interleaved with capacitive layers, e.g. of aluminium foil. Condenser cores are, e.g., used in bushings and cable terminations.

There is a move towards using larger diameter condenser cores. Due to the increase in diameter, the outermost capacitive layers may need to be created from joined foils, e.g. aluminium foils, since there are no aluminium foils available of the needed dimensions. This may cause problems of heating, difference in potential in the different foils of the capacitive layer and other issues during operation.

U.S. Pat. Nos. 3,793,475, 3,484,679, 3,600,502, WO80/00762 and U.S. Pat. No. 3,875,327 disclose conventional capacitive layers arranged around (high-voltage) conductors. The conductive layers may be grounded or connected to a potential.

SUMMARY

It is an objective of the present disclosure to provide a condenser core having a capacitive layer made up from two overlapping foils with reduced risk of potential difference between the foils and/or heat forming at a joint of the overlap.

According to an aspect of the present disclosure, there is provided a condenser core configured for surrounding an electrical conductor. The condenser core comprises an insulation material and a plurality of electrically conducting capacitive layers for modifying electrical fields formed by a current flowing in the electrical conductor. At least one of the electrically conducting capacitive layers comprises a first foil and a second foil. Each of the first and second foils of an outermost capacitive layer is connected with a grounding arrangement for grounding the foils.

According to another aspect of the present disclosure, there is provided an electrical device comprising an embodiment of the condenser core of the present disclosure.

In accordance with the present disclosure, each of the foils of the outermost electrically conducting capacitive layer is grounded by means of respective grounding arrangements (also called measuring taps since the grounding conductor thereof may also be used for performing measurements, e.g., of capacitance). Thus, the different foils are individually grounded (i.e., on both sides of the overlap) and not dependent on a good electrical connection between the foils at their overlap for ensuring equal electrical potential and low resistive heat formation at the overlap, e.g., at transient events such as a lightning strike.

A capacitive layer is herein defined as an electrically conducting layer comprising one or more foils arranged at a substantially constant radius around a longitudinal axis of the condenser core. Two foils located at different radii from the longitudinal axis of the condenser core therefore belong to different capacitive layers. Generally, different capacitive layers are not galvanically connected.

An outer capacitive layer consisting of two or more foils may be joined together with a conductive adhesive. This joint will have a resistance, even though the adhesive is conductive. Due to resistive heating during transient and very fast transient (VFT) events, as well as voltage potential differences, the resistive heating can cause problems in the condenser core if the ground connection is on one side of the foil joint. Introducing an additional ground connection on the other side of the bushing, e.g., positioned approximately 180 degrees from each other, will give current in the capacitive layer an additional route to ground, eliminating any current across the joint.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
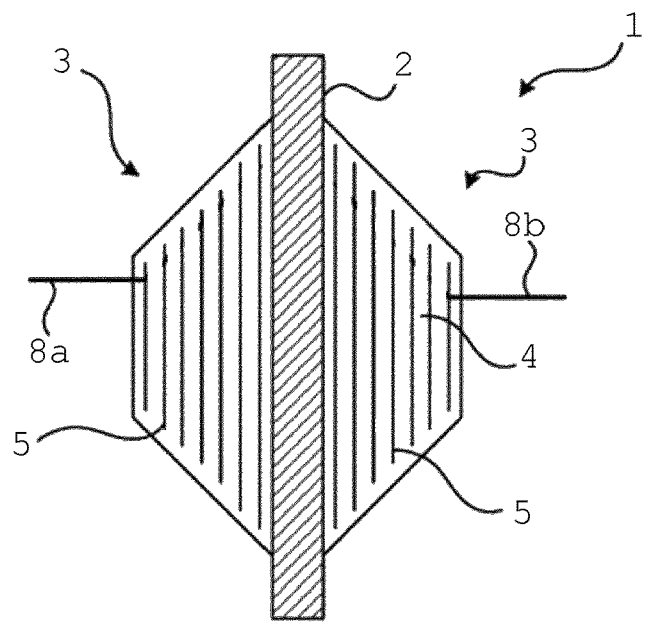
FIG. 1 is a schematic illustration in longitudinal section of an electrical device comprising a condenser core, in accordance with some embodiments of the present disclosure.

FIG. 1 illustrates an embodiment of an electrical device 1, e.g., comprising a bushing or a cable termination, typically a bushing. The electrical device 1 is typically configured for high-voltage applications. The electrical device 1 comprises an insulation in the form of a condenser core 3 surrounding a passage for an electrical conductor 2, e.g., a high-voltage electrical conductor. The condenser core 3 may thus define a longitudinal through-hole through which the electrical conductor 2 may pass. The condenser core 3 comprises an insulating material 4, e.g. of wound layers of a permeable solid material which may be impregnated with an electrically insulating fluid e.g. an oil or resin. The permeable solid material may, e.g., be cellulose based such as a paper material, e.g. craft or crêpe paper, or aramid papers such as NOMEX™ paper, or a combination thereof. The electrically insulating fluid may, e.g., comprise an oil, such as transformer oil, or a resin, such as a curable or thermosetting resin such as epoxy.

In some embodiments, the electrical device 1 may be or comprise a bushing 1, e.g., for allowing the electrical conductor 2 to pass through a wall, e.g., of a power transformer, converter or other electrical equipment. In other embodiments, the electrical device 1 may be or comprise a cable termination or any other arrangement where an electrical conductor 2 is insulated and the electrical field formed is modified by means of a condenser core 3.

The condenser core 3 comprises a plurality of electrically conducting capacitive layers 5, e.g., interleaved between layers of the wound layers, for modifying the electrical field formed by the conductor 2 in the electrical device 1 when in use, e.g. of aluminium (Al) and/or copper (Cu), preferably Al. Each capacitive layer 5 is thus substantially concentrically arranged partly or completely around the longitudinal through-hole (for the electrical conductor 2) of the condenser core 3. A plurality of concentrically arranged capacitive layers 5 are thus formed in the condenser core 3 at different radial distances from the longitudinal through-hole.

In order to reach all the way, or partly, around the longitudinal through-hole (circumferentially), outermore capacitive layers 5 are thus preferably longer than more inner capacitive layers 5 in the condenser core. In large condenser cores, having a large diameter, the outermost capacitive layer(s) 5 may be longer than there are conductive foils readily available. The capacitive layer(s) may thus comprise at least two foils, e.g., overlapping foils.

As schematically illustrated in FIG. 1, each of the foils of the outermost capacitive layer 5 is grounded via grounding conductors 8a and 8b electrically connected to each of the foils. As illustrated in the figure, the grounding conductors may ground the capacitive layers approximately 180° from each other.

Figure 2:
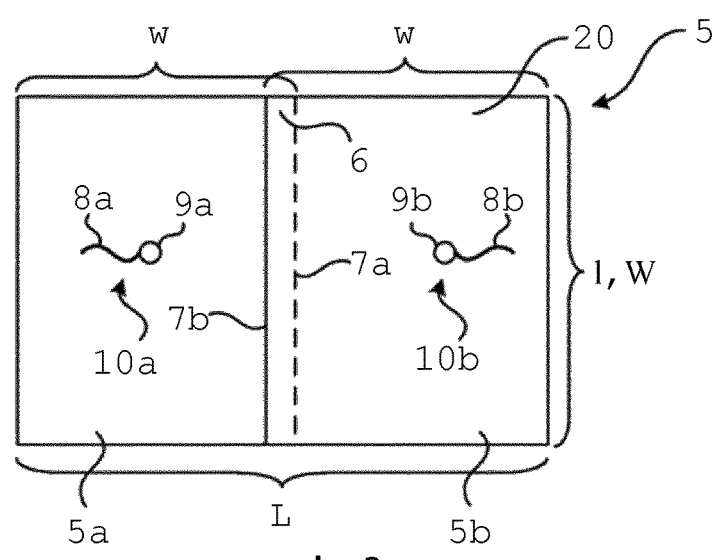
FIG. 2 is a schematic plan view of a capacitive layer formed by two overlapping foils, in accordance with some embodiments of the present disclosure.

FIG. 2 illustrates a capacitive layer 5, laid flat, comprising a foil sheet 20 formed by two overlapping first and second foils 5a and 5b, e.g. of Al and/or Cu, preferably Al. It should be noted that the first and second foils 5a and 5b of a capacitive layer 5 need not overlap to form a single foil sheet as in FIG. 2. In some embodiments, the first and second foils of the conductive layer 5 may be adjacent each other, possibly abutting along respective edges of the foils, but not necessarily overlapping. In other embodiments, the first and second foils 5a and 5b may be positioned in the same capacitive layer 5, i.e., be at substantially the same radial distance from the longitudinal through-hole, i.e., the central longitudinal axis, of the condenser core 3, but without overlapping or in direct contact with each other. In order to control the electric field it is, however, necessary to minimize a distance between the edges so that an electric potential of an inner layer does not generate a field that emanates through the gap. If there is a gap between the foils 5a and 5b of a capacitive layer, it may be necessary to bridge the cap galvanically through other means.

The first and second foils 5a and 5b may each have the same length l or different lengths l and/or the same width w or different widths w. In some embodiments, the first and second foils 5a and 5b may be of the same size. In the embodiments of FIG. 2, the first and second foils 5a and 5b are arranged next to each other to form a single foil sheet 20 of the capacitive layer 5, the sheet 20 having a length L and a width W. Herein, the length of a foil or sheet is the longer of the two main directions (i.e. not diagonally) of the foil or sheet 20, while the width is the shorter of said two main directions. The first and second foils 5a and 5b are typically rectangular in shape, with longitudinal edges having the same length as the length l of the foil and transverse edges having the same length as the width w of the foil. Each or either of the first and second foils 5a and 5b may have a width w within the range of from 1.8 to 2.2 m.

It should here be noted that the longitudinal direction of the longitudinal axis of the condenser core 1 must not be confused with definitions of the lengths l or widths w of the foils 5a and 5b, or with the length L or width W of the sheet 20. In other words, a foil 5a or 5b may have its length l aligned in parallel with the longitudinal axis of the condenser core 1, whereas a sheet 20 may have its width W aligned in parallel with the longitudinal axis of the condenser core 1.

In order to provide a capacitive layer 5 with a foil sheet 20 having a width W greater than the width w of the each or either of the first and second foils 5a and 5b, the first and second foils 5a and 5b may be arranged next to each other along respective longitudinal edges 7a and 7b of the foils, e.g. forming a joint 6 and/or overlap o (see FIG. 3) between the two foils. Typically, the foil sheet 20 of the capacitive layer 5, formed by the at least two foils 5a and 5b is rectangular in shape (when laid flat as in FIG. 2), e.g. by the first and second foils 5a and 5b having the same length l and being arranged next to each other along the whole of said length l of the respective longitudinal edges 7a and 7b of the foils.

In some embodiments, the edges 7a and 7b may be equal in length and may overlap or abut each other along the whole length l of the respective edges. If one edge is longer than the other, or if the first and second foils 5a and 5b are not carefully aligned, a corner of one foil may protrude from the sheet 20 formed by the foils. Such a corner may give rise to strong electric fields, especially as caused by transients, which may negatively affect the performance of the capacitive layer and the condenser core.

If the first and second foils 5a and 5b are overlapping, the overlap o may then be rectangular and have the same length as the length l of each of the foils 5a and 5b. The foil sheet 20 of the capacitive layer 5 may have a width W corresponding to the length l of each or either of the first and second foils 5a and 5b, thus being greater than the width w of each or either of the foils 5a and 5b. The width W of the foil sheet 20 of the capacitive layer 5 may e.g. be within the range of from 2.3 to 2.7 m. The length L of the foil sheet 20 of the capacitive layer 5 may e.g. be within the range of from 2.8 to 3.5 m. Typically, the foil sheet 20 is large enough to reach all the way around the central longitudinal throughhole in its capacitive layer 5.

In accordance with some embodiments of the present disclosure, each of the foils 5a and 5b of the outermost capacitive layer 5 can be grounded directly, i.e. not via a connection between the foils. Thus, each of the foils 5a and 5b comprises a grounding arrangement 10a or 10b enabling the foil to be grounded and thus be brought to the same electrical potential. Each of the grounding arrangements 10a and 10b may comprise a ground connection 9a/9b, e.g. of Cu, attached to the foil 5a/5b, which ground connection 9a/9b may be electrically connected with a grounding conductor 8a/8b e.g. in the form of respective electrical cords. The grounding arrangement 10a or 10b may comprise a measuring tap.

Figure 3:
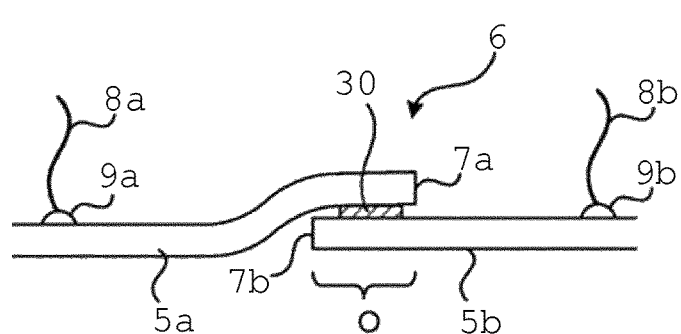
FIG. 3 is a detail of a schematic side view of two overlapping foils, in accordance with some embodiments of the present disclosure.

FIG. 3 illustrates an overlap o between the first and second foils 5a and 5b.

Even if the first and second foils 5a and 5b are overlapping each other, they may still be only partly electrically connected, or not electrically connected at all, along the overlap o, since the electrically insulating fluid may have been pressed in between the foils at the overlap o, slightly separating (and insulating) the foils from each other. The first and second foils 5a and 5b can still be regarded as part of the same capacitive layer 5, even if not at all electrically connected to each other, since the separation between the foils at the overlap o is relatively small, e.g., less than 5 mm and/or less than the width of the overlap o.

However, the first and second foils 5a and 5b are typically electrically connected to each other at the overlap o, e.g., by forming a joint 6 between the first and second foils. The joint 6 may be formed by the first and second foils 5a and 5b directly contacting each other along the overlap o, or via an electrically conductive adhesive 30.

Even if the first and second foils are electrically connected in a joint 6, the electrical resistance over the joint may be relatively high, potentially resulting in heat formation and affecting resonances. These problems are alleviated by means of the grounding of each foil, to either side of the joint 6, in accordance with the present invention.

According to the present invention, any number of conductive foils 5a and 5b may be comprised in a single conductive layer 5, wherein each foil of the outermost layer is grounded by its own grounding arrangement 10a and 10b. However, in some embodiments, the first and second foils 5a and 5b are overlapping by an overlap o at a first edge 7a of the first foil and a second edge 7b of the second foil. Additionally or alternatively, in some embodiments, the first and second foils 5a and 5b are of equal length l. In some embodiments, the first and second foils 5a and 5b are arranged such that the overlap o is at respective longitudinal edges 7a and 7b of the foils and has a length corresponding to the length l of the first and second foils. In some embodiments, the length L of the sheet 20 formed by the overlapping first and second foils of the capacitive layer 5 is greater than the length l of the first and second foils.

In some embodiments of the present disclosure, the overlap o comprises a joint 6 via which the first and second foils 5a and 5b are electrically connected. In some embodiments, the joint comprises a conductive adhesive 30.

In some embodiments of the present disclosure, the electrical device comprises any one of a bushing and a cable termination. In some embodiments, the electrical device further comprises the electrical conductor 2 passing through the condenser core 3.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A condenser core configured for surrounding an electrical conductor, the condenser core comprising an insulation material and a plurality of electrically conducting capacitive layers for modifying electrical fields formed by a current flowing in the electrical conductor;
   wherein at least one of the electrically conducting capacitive layers comprises a first foil and a second foil, wherein the first and second foils are overlapping by an overlap at a first edge of the first foil and a second edge of the second foil,
   wherein each of the first and second foils of an outermost capacitive layer is connected with a respective grounding arrangement for grounding the foils,
   wherein the first foil and the second foil are arranged to provide that respective longitudinal edges of the foils have a length corresponding to the first and second foils,
   wherein the first and second foils are of equal length,
   wherein the first and second foils are arranged such that the overlap is at respective longitudinal edges of the foils, wherein the first and second foils are partially electrically connected based on an electrically insulating fluid that is pressed between the first foil and the second foil, and
   wherein a length of a sheet formed by the overlapping first and second foils of the capacitive layer is greater than the length of the first and second foils.

2. The condenser core of claim 1, wherein the respective grounding arrangement comprises a measuring tap.

3. The condenser core of claim 1, wherein the overlap comprises a joint via which the first and second foils are electrically connected.

4. The condenser core of claim 3, wherein the joint comprises a conductive adhesive.

5. An electrical device comprising the condenser core of claim 4.

6. An electrical device comprising the condenser core of claim 1.

7. The electrical device of claim 6, wherein the electrical device comprises a bushing.

8. The electrical device of claim 7, further comprising the electrical conductor passing through the condenser core.

9. The electrical device of claim 7, further comprising the electrical conductor passing through the condenser core.

10. The electrical device of claim 6, further comprising the electrical conductor passing through the condenser core.

11. The electrical device of claim 6, wherein the electrical device comprises a cable termination.

12. The condenser core of claim 1, wherein the overlap comprises a joint via which the first and second foils are electrically connected.

13. The condenser core of claim 1, wherein the overlap comprises a joint via which the first and second foils are electrically connected.

14. The condenser core of claim 1, wherein the overlap comprises a joint via which the first and second foils are electrically connected.

15. The electrical device of claim 1, wherein a separation between the first foil and the second foil is less than 5 mm less than a width of the overlap.

\* \* \* \* \*